(12) United States Patent
Doyle

(10) Patent No.: US 8,204,879 B2
(45) Date of Patent: Jun. 19, 2012

(54) SYSTEM AND METHOD FOR AGGREGATION AND MONITORING OF MULTIMEDIA DATA STORED IN A DECENTRALIZED WAY

(75) Inventor: Philip W. Doyle, Malibu, CA (US)

(73) Assignee: Swiss Reinsurance Company Ltd., Zurich (CH)

( * ) Notice: Subject to any disclaimer, the term of this patent is extended or adjusted under 35 U.S.C. 154(b) by 619 days.

(21) Appl. No.: 12/314,292

(22) Filed: Dec. 8, 2008
(Under 37 CFR 1.47)

(65) Prior Publication Data
US 2010/0076962 A1    Mar. 25, 2010

Related U.S. Application Data

(63) Continuation of application No. 12/102,284, filed on Apr. 14, 2008, now abandoned.

(60) Provisional application No. 60/911,408, filed on Apr. 12, 2007.

(51) Int. Cl.
*G06F 7/00* (2006.01)
*G10L 21/02* (2006.01)
(52) U.S. Cl. ........................ 707/727; 704/228
(58) Field of Classification Search ............... None
See application file for complete search history.

(56) References Cited

U.S. PATENT DOCUMENTS

| | | | | |
|---|---|---|---|---|
| 5,465,353 | A * | 11/1995 | Hull et al. | 1/1 |
| 5,937,422 | A * | 8/1999 | Nelson et al. | 715/206 |
| 6,460,036 | B1 * | 10/2002 | Herz | 707/748 |
| 7,050,995 | B2 * | 5/2006 | Wojcik et al. | 705/28 |
| 2003/0233278 | A1 * | 12/2003 | Marshall | 705/14 |
| 2006/0036568 | A1 * | 2/2006 | Moore et al. | 707/1 |
| 2006/0217953 | A1 * | 9/2006 | Parikh | 704/1 |
| 2010/0070448 | A1 * | 3/2010 | Omoigui | 706/47 |
| 2010/0076962 | A1 * | 3/2010 | Doyle | 707/727 |

* cited by examiner

*Primary Examiner* — Rehana Perveen
*Assistant Examiner* — Arshia S Kia
(74) *Attorney, Agent, or Firm* — Oblon, Spivak, McClelland, Maier & Neustadt, L.L.P.

(57) ABSTRACT

System and method for aggregation and monitoring of multimedia data stored in a decentralized way for triggering upcoming class action events, whereas source databases of the network node are accessed by a filter module, and for at least one rating parameter in connection with assigned search key words and/or the assigned source databases with respect to a time-based rating and an exposure-based frequency rating a scorecard is generated with found data sets, and a parameterization module, based on the scorecard for the respective rating parameter with respect to their exposure-based frequency a variable frequency value is generated at least partially dynamically, which variable frequency value corresponds to network class action frequency variations, with respect to time, and a tracing unit based on a generated assigned distribution of the variable frequency values a predefined exposure threshold is triggered.

29 Claims, 1 Drawing Sheet

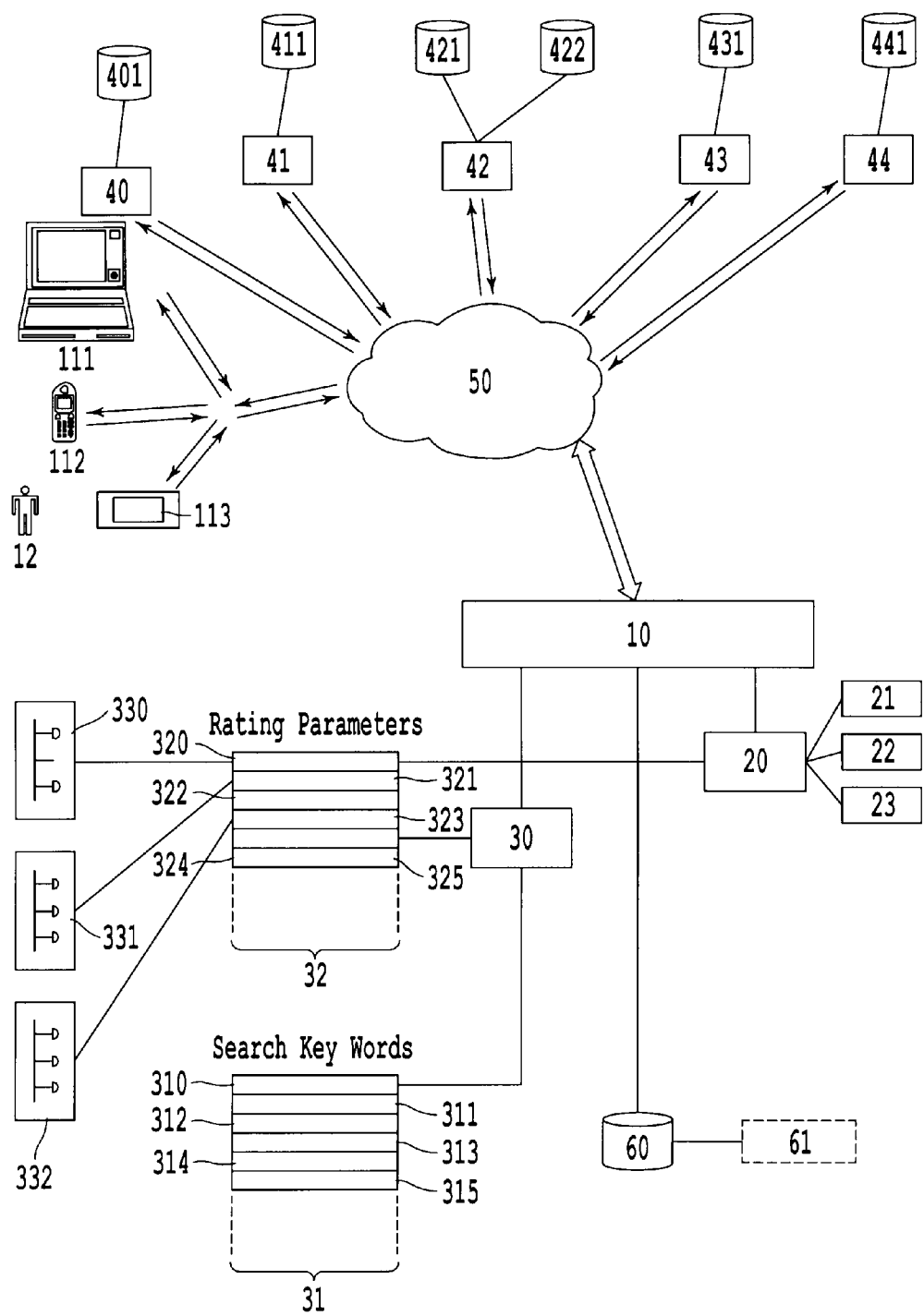

SYSTEM AND METHOD FOR AGGREGATION AND MONITORING OF MULTIMEDIA DATA STORED IN A DECENTRALIZED WAY

The invention relates to a system and method for aggregation and monitoring of multimedia data stored in a decentralized way triggering upcoming class actions. One or more linkable search key words are stored in a memory. A computing unit accesses, via a network, network nodes connected to source databases, and selects data from the source databases based on the search key words. The invention relates in particular to a system and method for real-time analysis of such multimedia data stored in a decentralized way.

STATE OF THE ART

Networks as the worldwide backbone network and distributed data sources are undoubtedly one of the most important means of information supply today in industry, science and technology, and belongs probably to the most significant technical achievements of the close of the 20th century. It is a fact that enormous amounts of data can be accessed today via the Internet, to an extent hardly conceivable 10 years ago. Despite all the advantages stemming there from, however, there also arises thereby the difficulty of locating really relevant data in this huge quantity of information. Search engines, such as, for instance, the well-known Internet search engines including e.g. the well-known Altavista engine as word-based search engine or e.g. the Yahoo engine as topic-based search engine, make the multiplicity of decentralized data sources usable for the user in the first place, since without such tools the hope that as many of the relevant data as possible are really found sinks drastically. This is shown in particular in the statistical fact that the users of such networks spend more time online with search engines than anywhere else. Despite all the progress in this field, the search engine technology available in the state of the art frequently gives the user no really satisfactory answers. For real monitoring and aggregating of data industry needs for most technical problems more sophisticated and/or adapted technologies. It is precisely for such examples that the traditional search engines cannot be used, or can only be used in part. In particular they do not permit any actual real-time monitoring, which can be necessary in such a case.

Corporate entities, institutions, limited liability partnerships, limited liability companies, partnerships, bank and non-bank financial institutions, including: investment banks; merchant banks; commercial banks; securities firms, including broker dealers securities and commodities trading firms; asset management companies, securities exchanges and bourses, law firms, accounting firms, auditing firms and other entities, hereinafter collectively referred to as "Institutions", typically have few resources available to them to assist in the identification of present or potential risks associated with available particular investment or trading account or e.g. a insurance portfolio. Risk can be multifaceted and far-reaching. Generally, personnel responsible for decision making associated with risks do not have available a mechanism to provide real time assistance to access a risk factor or otherwise qualitatively manage risks. In the event a legal issue arises, it is often difficult to quantify to regulatory bodies, shareholders, newspapers and other interested parties, the diligence exercised by the institution or other entity to properly identify and respond to risk assessment factors. Absent means to quantify good business practices and diligent efforts to contain risk, an institution may appear to be negligent in some respect.

Risk associated with entering into and/or participating in a legal action can include factors associated with financial risk, legal risk, regulatory risk and reputational risk. Financial risk includes factors indicative of monetary costs that the financial institution may be exposed to as a result of opening a particular account and/or transacting business with a particular client. Monetary costs can be related to fines, forfeitures, cost to defend and adverse position, or other related potential sources of expense. Regulatory risk includes factors that may cause the financial institution to be in violation of rules put forth by regulatory agency such as the Securities and Exchange Commission (SEC). Reputational risk relates to harm that a financial institution may suffer regarding its professional standing in the industry. A financial institution can suffer from being associated with a situation that may be interpreted as contrary to an image of honesty and forthrightness.

Situations involving assertion or enforcement of one aspect or another of an applicable rule of law can include legal action, arbitration, regulatory action, audit by a government agency or other authority, a criminal proceeding, hereinafter referred to as "Legal Action".

The uncertainties of litigation are well known. Similarly, legal actions in general have unique and diverse variables associated with their associated risks. Decisions relating to legal action need to consider numerous factors in order to be able to adequately assess the risk involved with a legal action. Some factors may include: whether a legal action could involve a class action (CA) status; is the issue safety related; the geographical area of occurrence, the demographics of the occurrence; the jurisdiction; any regulatory interest; political aspirations of a participant or prosecutor; does it involve a natural constituency; does it involve a voting bloc; what public relation qualities or implications are involved; and other associated considerations.

Risk associated with a legal action can be greatly increased as compared to other corporate endeavors due to the difficulty in gathering, accessing, and appropriately analyzing pertinent data on a basis timely to managing risk associated with the legal action. In-house counsel, corporate officers and other personnel responsible for limiting exposure to risk associated with legal actions typically have few resources available to assist them with identification of present or potential risks associated with a particular legal action or proposed legal risk. Risk can be multifaceted and far-reaching. The amount of information that needs to be considered to evaluate whether particular legal action poses a significant risk or should otherwise be restricted or avoided, can be substantial. Corporate counsel and other decision makers need a mechanism which can provide real time assistance to assess a risk factor associated with a legal action, and/or otherwise qualitatively mange such risk.

Deductive from the above said, it is technically very difficult to detect or trigger upcoming class actions or other legal actions. Halfway realizations are known in the state of the art. The U.S. patent application US2003/0195872 discloses a system, which can be used to connect search key words with terms of emotional judgment and to carry out a search in the Internet and/or intranet based on this assignment of search key words and terms of emotional judgment. The system does not allow any targeted screening of databases, however. In particular, no information with respect to time is possible by means of the system. This prevents or respectively renders impossible an objective assessment of tendencies or events to be expected. The system merely permits a static listing of documents stored in the available databases. Thus more or less all relevant documents in this system must be read completely after the listing and interpreted, which makes impossible an automation in the sense of e.g. a dynamic warning system. US2002120609 discloses a search engine system for a portal site on the Internet. The search engine system employs a regular search engine to make one-shot or demand searches for information entities which provide at least threshold matches to user queries. The search engine system also employs a collaborative/content-based filter to make continuing searches for information entities which match existing wire queries and are ranked and stored over time in user-accessible, system wires corresponding to the respective queries. A user feedback system provides collaborative feedback data for integration with content profile data in the operation of the collaborative/content-based filter. A query processor determines whether a demand search or a wire search is made for an input query.

TECHNICAL OBJECT

It is an object of this invention to propose a new system and a method for aggregation and monitoring of multimedia data stored in a decentralized way, which do not have the above-mentioned drawbacks of the state of the art. In particular, an automated, simple and rational system and method should be proposed to carry out complex content-oriented queries. Moreover a method and system is needed to draw upon information gathered globally and utilize the information to assist with risk management and due diligence related to legal actions, in particular class actions (CA) or securities class actions (SCA). In addition, the method and system should offering guidance to personnel who are responsible for initiating or dispensing with legal issues and help to identify high risk situations and generate appropriate signaling e.g. for signaling devices, alarm devices and interfaces and trigger devices. Additionally, it should be able to automatically convey risk information to legal, corporate, and/or compliance departments and/or insurance/reinsurance systems, as automated damage covering systems, and be able to demonstrate to regulators that an institution has met reasonable standards relating to risk containment.

This object is achieved according to the present invention in particular through the elements of the independent claims. Further advantageous embodiments follow moreover from the dependent claims and from the description.

In particular, these objects are achieved according to the invention in that, for aggregation and monitoring and/or analysis of multimedia data stored in a decentralized way for triggering upcoming class actions and/or legal actions, one or more linkable search key words being stored in a memory, a computing unit accessing, via a network, network nodes connected to source databases, and data from the source databases being selected based on the search key words whereas stored, assigned to a search key word and/or to a combination of search key words in a memory, is at least one rating parameter, whereas the source databases of the network node are accessed by means of a filter module of the computing unit, and for each rating parameter in connection with the assigned search key words and/or the assigned source databases with respect to an time-based rating and an exposure-based frequency rating a scorecard is generated with found data sets, whereas by means of a parameterization module, based on the scorecard for the respective rating parameter with respect to their exposure-based frequency a variable frequency value is generated at least partially dynamically, which variable frequency value corresponds to network class action frequency variations and/or legal action frequency variations, with respect to time, and whereas by means of a tracing unit based on a generated assigned distribution of the variable frequency values a predefined exposure threshold is triggered, whereas a trigger signal is generated with respect to time and the variable frequency values (21) and transmitted for activation to a receiving work unit. This is that the trigger is carried out with respect to time and the variable frequency values. For generation of variable frequency values and/or of the data of the content module, the computing unit can comprise e.g. an HTML (Hyper Text Markup Language) and/or HDML (Handheld Device Markup Language) and/or WML (Wireless Markup Language) and/or VRML (Virtual Reality Modeling Language) and/or ASP (Active Server Pages) module. This embodiment variant has the advantage, among others, that the system is based on a collective whole, specifically definable beforehand, of sources from the network, in particular from the Internet (e.g. websites, chat rooms, e-mail forums, etc.), which are also scanned according to search criteria definable beforehand. The system thus makes possible the mentioned screening of predefinable sources and their systematic and thereby quantitatively relevant evaluation according to the desired and defined criteria with respect to contents (e.g. which medicines are mentioned in connection with serious side effects—and at what rate of frequency). This content screening can take place in a periodic sequence (with respect to time) and thus make possible statistical predictions, and this over time. Of course the documents can also be registered elsewhere with respect to their temporal correlation, e.g. based on the date of storage. The system also can identify when which content was entered in the said sources. Since in this way a quantitative evaluation is thereby possible, the system can monitor the defined source self-sufficiently, and show accordingly the exceeding of a threshold value (quantitative). As an embodiment variant the trigger signal can be transmitted as activation signal to a derivative operation system automatically activating or blocking corresponding financial transactions. In another embodiment variant the trigger signal can be transmitted e.g. as activation signal to an automated (re)insurance operation system automatically activating or blocking corresponding financial transactions.

In embodiment variant, one or more of the rating parameters are generated dynamically by means of the computing unit during the generation of the scorecard. This embodiment variant has the same advantages, among others, as the preceding embodiment variant.

In a further embodiment variant, the scorecard is stored, in a way accessible to a user, with the found data sets and/or links to found data sets in a content module of the computing unit. This embodiment variant has the advantage, among others, that the system can be used e.g. as a warning system for the user informing and/or warning him about imminent tendencies in the market or in the population (e.g. class actions, etc.).

In an embodiment variant, variable frequency values are periodically checked by means of the computing unit, and, if at least one of the variable frequency value lies outside a definable tolerated range of deviation or a determinable expected value, the corresponding scorecard with the found data sets and/or links to found data sets is stored in the content module of the computing unit accessible for a user and/or updated. This embodiment variant has the advantage, among others, that the databases can be scanned in a targeted way for temporal changes or events to be expected, e.g. by means of definable probability threshold, and can thus e.g. warn the user in time (e.g. product flaw, product liability, etc.).

In still another embodiment variant, a user profile is created based on user information, user-specific optimized data being generated, by means of a repackaging module, based on the found data sets and/or links to the found data sets stored in the content module, taking into consideration the data of the user profile, which user-specific optimized data are stored in the content module of the computing unit in a way made available to the user. As an embodiment variant, different user profiles for different communication devices of the user can be stored assigned to the user. Furthermore, e.g. data on user behavior can also be automatically captured by the computing unit and stored assigned to the user profile. This embodiment variant has the advantage, among others, that different access possibilities of the user can be taken into consideration in a user-specific way, and the system can thus be optimized user-specifically.

In an embodiment variant, by means of a history module the values up to a definable past point in time are stored for each calculated variable frequency value. Among other things, this embodiment variant has the same advantages of a time monitoring and capturing of changes within the stored and accessible documents.

In a further embodiment variant, by means of an extrapolation module, the computing unit calculates expected values for a determinable variable frequency values based on the data of the history module for a definable future point in time and stores them in a memory of the computing unit. This embodiment variant has the advantage, among other things, that events to be expected can be predicted in an automated way. This can make sense, not only in the case of warning systems (e.g. relating to class actions with product liability, etc.), but in a completely general way with systems in which a statistical-temporal extrapolation is important, such as with risk management systems on the stock market or financial markets, etc.

It should be stated here that, besides the method according to the invention, the present invention also relates to a system for carrying out this method. Furthermore it is not limited to said system and method, but likewise relates to a computer program product for achieving the method according to the invention.

Embodiment variants of the present invention will be described in the following with reference to examples. The examples of the embodiments are illustrated by the following attached FIGURES:

FIG. 1 shows a block diagram, showing schematically a system or respectively a method for aggregation and analysis of multimedia data stored in a decentralized way for triggering upcoming class actions. One or more linkable search key words 310,311,312,313, 314,315 are stored in a memory 31. A computing unit 10 accesses, via a network 50, network nodes 40,41,42,43,44 connected to source databases 401, 411,421,431, and data from the source databases 401,411, 421,422,431,441 are selected based on the search key words 310,311,312,313.

FIG. 1 illustrates schematically an architecture, which can be used to achieve the invention. In this embodiment example, for aggregation and analysis of multimedia data stored in a decentralized way, one or more linkable search key words 310,311,312,313 are stored in a memory 31. To be understood by multimedia data are, among other things, digital data such as texts, graphics, pictures, maps, animations, moving pictures, video, Quicktime, sound recordings, programs (software), program-accompanying data and hyperlinks or links to multimedia data. Belonging thereto are also e.g. MPx (MP3) or MPEGx (MPEG4 or 7) standards, as they are defined by the Moving Picture Experts Group. In particular, multimedia data can comprise data in HTML (Hyper Text Markup Language), HDML (Handheld Device Markup Language), WMD (Wireless Markup Language), VRML (Virtual Reality Modeling Language) or XML (Extensible Markup Language) format. A computing unit 10 accesses, via a network 50, network nodes 40,41,42,43 connected to source databases 401,411,421,431, and data from the source databases 401,411,421,431 are selected based on the search key words 310,311,312,313. According to the present invention, the computing unit 10 is bidirectionally connected to the network nodes 40,41,42,43 over a communications network. The communications network 50 comprises, for example, a GSM or a UMTS network, or a satellite-based mobile radio network, and/or one or more fixed networks, for example the public switched telephone network, the worldwide Internet or a suitable LAN (Local Area Network) or WAN (Wide Area Network). In particular it also includes ISDN and XDSL connections. The multimedia data can be stored in a way accessible to the computing unit 10, as shown, in different places in different networks or locally. The network nodes 40,41,42,43 can comprise WWW servers (HTTP: Hyper Text Transfer Protocol/WAP: Wireless Application Protocol, etc.), chat servers, e-mail servers (MIME), news servers, e-journal servers, group servers, or any other file servers, such as e.g. FTP servers (FTP: File Transfer Protocol), ASD (Active Server Pages)-based servers or SQL-based servers (SQL: Structured Query Language), etc.

In a memory 32 of the computing unit 10 at least one rating parameter 320,321,322 is assigned to a search key word 310, 311,312,313 and/or to a combination of search key words 310,311,312,313 and is stored. The search keyword 310,311, 312,313 and/or a combination of search key words 310,311, 312,313 comprises the actual search term. The rating parameters 320,321,322,323,324,325 on the other hand, include the evaluation topic, e.g. a selected risk for a certain company, class action, legal action, court case, etc. with corresponding evaluation attributes. The evaluation attributes can be specific for a rating parameters 320,321,322, e.g. damages, liability, amount insured etc.

It is important to point out that the rating parameters 320, 321,322 can also contain limitations with respect to the network 50 and/or specific network nodes 40-43. As an example, it is entirely possible to limit the aggregation and analysis of the multimedia data to certain news groups and/or websites, for instance, by means of corresponding rating parameters 320,321,322. In the same way it can be useful for the one or more rating parameters 320,321,322 to be generated at least partially dynamically by means of the computing unit 10 during the generation of the scorecard 330,331,332. Dynamically can mean, for instance, that the parameterization module 20 or the filter module 30 checks the multimedia data and/or data of the scorecard 330, 331, 332 by way of association according to a rating parameter 320, 321, 322 during indexing and/or at a later point in time of the method, and adds them to the rating parameter 320,321,322. It can make sense in this case for the rating parameters 320,321,322 to be editable by the user 12. Analysis modules, for instance, based on neural network algorithms, can be particularly useful during the dynamic generation.

In the memory 32, at least one of the source databases 401,411,421,431 can be stored assigned to a search key word 310,311,312,313 and/or a combination of search key words 310,311,312,313. The assignment can comprise not only explicit network addresses and/or links of databases, but also categories and/or groups of databases, such as e.g. websites, chat rooms, e-mail forums, etc. etc.). The assignments can be achieved in an automated way, in a partially automated way, manually and/or based on a user profile and/or on other user-specific and/or application-specific data. By means of a filter module 30, the computing unit 10 accesses the source databases 401,411,421,431 of the network nodes 40,41,42,43, and generates for each rating parameter 320,321,322 in connection with the assigned search key words 310,311,312,313 and/or source databases 401,411,421,431 a scorecard 330, 331,332 with found data sets. It is immediate to one skilled in the art that the evaluation topic as e.g. the risk does not have to be necessarily treated in a way ranked equally with the evaluation attributes during indexing. For generation of the scorecard 330,331,332 based on the multimedia data, e.g. metadata, based on the content of the multimedia data, can be generated or respectively aggregated, by a metadata extraction module of the computing unit 10. This means that the scorecard 330,331,332 can thus contain such metadata. The metadata or in a completely general way the data of the scorecard 330,331,332 can be extracted e.g. using a content-based indexing technique, and can comprise catchwords, synonyms, links to multimedia data (e.g. also hyperlinks), picture and/or sound sequences, etc. Such systems are known in the state of the art in the most diverse variations. Examples thereof are the U.S. Pat. No. 5,414,644, which describes a three-file indexing technique, or the U.S. Pat. No. 5,210,868, which additionally stores during the indexing of the multimedia data and extraction of the metadata also synonyms as search key words. In the present embodiment example, the metadata can also be generated at least partially dynamically (in real time), however, based on user data of a user profile. This has the advantage that the metadata always have meaningful up-to-datedness and precision for the user 12. From the user behavior at the communication device 111, 112, 113 to the metadata extraction module there thus exists a kind of feedback possibility, which can directly influence the extraction. So-called agents can also be employed, in particular in the search for certain data.

The source databases 401,411,421,431 of the network node 40,41,42,43 are accessed by means of a filter module 30 of the computing unit 10, and for each rating parameter 320, 321,322 in connection with the assigned search key words 310,311,312,313 and/or the assigned source databases 401, 411,421,431 with respect to an time-based rating and an exposure-based frequency rating a scorecard 330,331,332 is generated with found data sets. By means of a parameterization module 20, based on the scorecard 330,331,332 for the respective rating parameter 320,321,322 with respect to their exposure-based frequency a variable frequency value 21 is generated at least partially dynamically, which variable frequency value 21 corresponds to network 50 class action (CA) frequency variations and/or legal action frequency variations, with respect to time.

The SCA frequency can be realized as a function of one or more exposure variables. These variables may be e.g., market cap (or some other size metric), stock price volatility, industry sector, etc. They can be detected and/or generated automatically or semi-automatically or manually. In an embodiment variant class action event severity can be e.g. an automated function of one or more exposure variables (not necessarily the same variables as those used for frequency).

To price an account, the concerning firm or cedant provides with a bordereau of their in-force risks. The bordereau might include the exposure variables for each risk. A preferable alternative would be for the bordereau to include sufficient identification (stock ticker, for example) to allow determining the exposure variables ourselves through an automated process involving data lookups (e.g. from Bloomberg or Yahoo! or some other source). The frequency function is then applied to each risk to determine the probability of an SCA attaching to this risk. This will be used to construct an exposure-based SCA frequency distribution for the portfolio itself using a simulation model.

For cedants with stable and voluminous experience, it is required historical bordereaux, and historical SCA experience. From this, it is possible to estimate historical SCA frequency. It could be preferable to extract the historical experience from a master list of historical SCAs. If the experience is sufficiently credible, the experience estimate can be used to adjust the exposure-based frequency model. The frequency model will need to be loaded for correlation and for systemic risk. It is possible to parameterize these loads in different ways; most e.g. to extract them from a frequency study table or the like, and adjust them for the firm or cedant experience and for portfolio characteristics (such as diversification). As an embodiment variant different severity results can e.g. be used to calculate an expected loss per SCA for each risk in the portfolio, based on the exposure variables for the particular risk. As before, the exposure variables can e.g. be automatically generated using the identifiers in the bordereau. In such an embodiment variant these values also can e.g. be used to calibrate the contractual payouts per risk. In the simplest version of this product, the payouts can be e.g. constant. A more refined version has payouts, which vary by risk (keyed off of limit and attachment, for example). Once the contractual payouts have been specified, they will be loaded onto the frequency model to produce the loss model for the treaty, which will then be used to price the treaty.

The mentioned user profile can be created e.g. on the basis of user information, and be stored, assigned to the user 12, in the computing unit 10. The user profile either remains permanently stored assigned to a particular user 12, or it is generated temporarily. The communication device 111/112/113 of the user can be, for instance, a PC (Personal Computer), TV, PDA (Personal Digital Assistant) or a mobile radio device (in particular in combination e.g. with a broadcasting receiver). The user profile can comprise information about a user such as e.g. location of the communication unit 111/112/113 of the user in the network, identity of the user, user-specific network features, user-specific hardware features, data about user behavior, etc. The user 12 can establish and/or modify beforehand for a search query at least portions of user data from the user profile. Of course the possibility always remains for the user 12 to search for and access multimedia data through direct access, i.e. without search and compiling aid of the computing unit 10. The rest of the data of the user profile can be determined automatically by the computing unit 10, by an authorized third party, or likewise by the user. Thus the computing unit 10 can have e.g. automatic port identification, user identification and/or automatic recording and evaluation of the user behavior (time of access, frequency of access, etc.). These data on user behavior can in turn be modifiable by the user in accordance with his wishes.

By means of a tracing unit based on a generated assigned distribution of the variable frequency values 21 a predefined exposure threshold is triggered, whereas the trigger is carried out with respect to time and the variable frequency values 21. By means of a parameterization module 20, based on the scorecard 330,331,332, for the respective rating parameter 320,321,322, the variable frequency values 21 is generated at least partially dynamically. HTML and/or HDML and/or WML and/or VRML and/or ASD can be used, for example, for generation of the variable frequency values 21 and/or of the data of the content module 60. As an embodiment example, the scorecard 330,331,332 with the found datasets and/or links to found datasets may be stored in a content module 60 of the computing unit 10 in a way accessible for a user. In order to be able to access the content module 60, it can make sense (e.g. for billing of the service availed of) to identify a particular user 12 of the computing unit 10 by means of a user database. Used for identification can be e.g. Personal Identification Numbers (PIN) and/or so-called smart cards. Smart cards normally call for a card reading device at the communication device 111/112/113. In both cases, the name or another identification of the user 12 as well as the PIN are transmitted to the computing unit 10 or to a trusted remote server. An identification module or respectively authentication module decrypts (if necessary) and checks the PIN via the user database. As an embodiment variant, credit cards can likewise be used for identification of the user 12. If the user 12 users his credit card, he can also enter his PIN. Typically the magnetic strip of the credit card contains the account number and the encrypted PIN of the authorized owner, i.e. in this case the user 12. The decryption can take place directly in the card reading device, as is usual in the state of the art. Smart cards have the advantage that they permit a greater degree of security against fraud through an additional encryption of the PIN. This encryption can take place either through a dynamic numerical key, containing e.g. time, day or month, or another algorithm. The encryption and identification does not take place in the device itself, but externally via the identification module. A further possibility is presented by a chip card inserted directly into the communication device 111/112/113. Involved in the case of the chip card can be e.g. SIM cards (Subscriber Identification Module) or smart cards, the chip cards being assigned a call number in each case. The assignment can take place e.g. via a HLR (Home Location Register), in that in the HRL the IMSI (International Mobile Subscriber Identification) is stored assigned to a call number e.g. to an MSISDN (Mobile Subscriber ISDN). An unambiguous identification of the user 12 is then possible by way of this assignment.

To start a search query, e.g. a user 12 transmits, via a front end, a search request for the respective query from the communication device 111/112/113 over the network 50 to the computing unit. The search request data can be entered via input elements of the communication device 111/112/113. The input elements can include e.g. keyboards, graphic input elements (mouse, trackball, eye tracker with Virtual Retinal Display (VRD), etc.), but also IVR (Interactive Voice Response), etc. The user 12 has the possibility of determining at least part of the search request data himself. This can take place e.g. in that the user is prompted by the receiving device 111/112/113 to complete a corresponding front-end query via an interface. The front-end query can include in particular an additional authentication and/or fees for the query. The search request data are checked in the computing unit 10, and if they fulfill definable criteria, the search is carried out. To obtain as good an up-to-datedness of the data as possible, or to achieve an ongoing or permanent monitoring of the network, the variable frequency values 21 can be checked periodically by means of the computing unit 10, for example, and if at least one of the variable frequency values 21 lies outside a definable tolerated range of deviation or a determinable expected value, the corresponding scorecard 330,331,332 with the found data sets and/or references to found data sets can be stored in the content module 60 of the computing unit 10 in a way accessible for a user, and/or updated. For user-specific demands it can make sense for the user profile to be created, for instance, based on user information, e.g. based on the found datasets and/or links to found datasets stored in the content module 60, user-specific optimized data being generated by means of a repackaging module 61 taking into consideration the data of the user profile. The user-specific optimized data can then be made available to the user 12, e.g. stored in the content module 60 of the computing unit 10. It can be advantageous for different user profiles for different communication devices 111,112,113 of a user 12 to be stored assigned to this user 12. Data on user behavior, for example, can also be automatically captured by the computing unit 10 for the user profile, and stored assigned to the user profile.

It is important to point out that, as an embodiment variant, by means of a history module 22, the values can be stored up to a definable past point in time for each calculated variable frequency values 21. This allows e.g. the computing unit 10 to calculate, by means of an extrapolation module 23, expected values for a determinable variable frequency values 21 for a definable future point in time, based on the data of the history module 22, and to save them in a memory of the computing unit 10. Thus not only can the user 12 be informed about current variable frequency values variation, but he can also access expected values for future behavior of the network users, and prepare himself accordingly.

It is important, that as an embodiment variant for the triggering the predefined exposure threshold can comprise aggregating a parametric stop index. Moreover the parametric stop index can comprise incrementing occurring class action (CA) events and/or the parametric stop index can be assigned to a parametric aggregated stop loss parameter for triggering automated damage intervention systems. In this embodiment variant for example for liability insurance as e.g. US Public Director's and Officer's liability insurance (D&O) the liability insurance is a moderately long-tailed line with uncertain ultimate loss. Current volatility is mainly driven by large Securities Class Action claims (SCA), which are filed in US Federal Court by shareholders organized as a class (internal expert estimated that 90% of D&O loss is SCA driven). Therefore the insurance industry had to be very selective with parametric insurance and reinsurance mechanism and methods e.g. by reducing or restricting their participation. Main reason for this have been the following concerns: (i) The nature of the exposure is dependent on economic, financial, legal, political, and social developments. (ii) This uncertainty results to unusual potential for systemic risk. (iii) It also may cause shifts in the market price of the underlying product, as participants continually re-evaluate the exposure in light of current circumstances. (iv) Price shifts are magnified in the more commoditized capacity layers as opportunistic capital enters and exits the market. (v) Liability insurers as D&O (re)insurers must hold sufficient capital to support both the high volatility of result and the long delay in resolution.

However the need to file SCA claims with an external neutral body provides with the opportunity to use this number of claims as an index to structure a parametric (re)insurance automated systems or other products. This cover would address client needs while it will also reduce the tail of exposure and remove severity risk for the insurer. Current estimates show that a parametric reinsurance system or product can reduce the cost of reinsurance (cost of capital, internal expense, brokerage) with appr. 40% (under review by Actuarial) compared to traditional offerings, which could compensate clients for an increase in basis risk. As example: the current direct D&O market in the USA (expert opinion) is USD 8.5 b of which USD 2.5 B or 29% is reinsured. Historical performance shows that D&O has been volatile for both cedants and reinsurers. During '95-04, the reinsurance combined ratio exceeded cedant's net by 33 points on average which indicates that reinsurers paid a significant share of market losses. Both D&O insurers and reinsurers suffered poor results in the late 1990's and early 2000's, which accelerated the industry's move toward a more robust technical evaluation of D&O exposure. A typical reinsurer would prefer to reinsurer D&O for this portfolio on a quota share basis. Clients on the other hand prefer to protect their portfolio with an Excess of Loss (XoL). However, the reinsurer is concerned with the potential for misalignment of interests under this structure It is an object of the invention for this embodiment variant to create a proportional parametric reinsurance system for the public D&O market) as e.g. the US market) which can be attractive to various client segments/channels: (1.) Brokers—dominate the public D&O with an estimated market share of 90% in the US market; (2.) Current cedants—with moderate portfolio turnover and who are not experiencing rapid exposure growth; (3.) Net writers—in addition there is an opportunity to offer this concept to direct writers who currently retain the major part of their exposure, such as AIG (American International Group, Inc.) or Chubb Insurance Company of Europe. It is to note, that in practice, the most suitable clients for this product will have a only moderate turnover and are not experiencing rapid exposure growth. In the example of the US D&O market, the main distribution channel for the US D&O market is the broker channel. Presently, the market is dominated by 5 brokers who control 90% of the broker market.

The invention can work in both soft and hard market cycles. Demand for the invention might be highest in the softest part of the cycle, when cedants feel that they have the smallest margin to absorb error, and are at the same time under greatest pressure to compromise their underwriting standards. At this stage they are often willing to accept basis risk for the relatively inexpensive aggregated protection of a parametric stop loss. Moreover, softening prices may be driven by reduced SCA activity (not just excess capital), in which case a stop loss might be seen as an attractive mechanism to insure cedants against the very real possibility that the reduction is temporary. On the other hand, in hard market cycles where capital is constrained, the improved cash flow and reduction in reinsurance leverage provided by a parametric quota share might be attractive to cedants. Moreover, although carriers may perceive less need of protection in a hard market, they are motivated at this stage to keep as much excess profit as possible, which could highlight the cost savings of parametric structures. The cushion provided by high margins can make cedants more willing to accept basis risk in return for retaining profit.

This set of circumstances suggests that there are bilateral interest in revising current reinsurance practice e.g. for US D&O through systems as the present invention. For this embodiment the invention can be used in at least three basic product classes: (1.) Parametric reinsurance: A face value is paid for each SCA attaching to a particular D&O portfolio, within a prescribed range. (2.) Pure derivative: A face value is paid for each SCA in excess of (or below) a pre-determined number during a specified term. (3.) Retrocessional bond. For number 1, parametric reinsurance is most likely to be of most immediate interest as option and in the following, the embodiment variant will be applied to option 1, 2 and 3 require a better understanding of the economic drivers (correlation) of SCA's. Whereas option 1 can be prices based on current pricing practices. Potential reinsurance structures are a quota share and stop loss cover. The general concept can e.g. be that a face value is paid for each SCA attaching to a particular D&O portfolio, within a prescribed range. The tenor of the contract can e.g. be one year.

In this embodiment variant as an example a parametric quota share system according to the invention can be consider in the following way: A portfolio can e.g. be given with the following expected characteristics for the prospective treaty year (i) 1000 earned policy years; (ii) 200M earned premium; (iii) limits to vary from 10 to 20M; (iv) attachments to vary from 0 to 100M. Using the frequency and severity characteristics of the risks, the probability of closure without payment, and an assumed discount factor, it can e.g. be expected that 30 SCAs will attach during the treaty year and the present value of cedant's payout per SCA will be 4M.

Furthermore, the embodiment variant can e.g. foresee that the cedant will pay the (re)insurance system 8M at the end of each quarter, one month in arrears, whereas the (re)insurance system will pay the cedant 1M for each SCA attaching during the treaty year, at the end of the year, one month in arrears.

| Number of SCAs attaching to the portfolio | (Re)insurance system profit |
|---|---|
| 23 | +9.0 M |
| 30 | +2.0 M |
| 32 | 0.0 M |
| 34 | −2.0 M |
| 37 | −5.0 M |
| 49 | −17.0 M |

In this embodiment variant as an example a parametric aggregate stop loss according to the invention can be consider in the following way: A portfolio can be given as described above. The embodiment variant can foresee that the cedant e.g. pay the (re)insurance system 1.5M at the end of each quarter, one month in arrears and the (re)insurance system will pay the cedant 3M for each SCA attaching during the treaty year in excess of 32, at the end of the year, one month in arrears. The (re)insurance system will pay as threshold the cedant no more than 30M in total.

| Number of SCAs attaching to the portfolio | (Re)insurance system profit |
|---|---|
| 23 | +6.0 M |
| 30 | +6.0 M |
| 32 | +6.0 M |
| 34 | 0.0 M |
| 37 | −9.0 M |
| 49 | −24.0 M |

One of the advantages of the embodiment variant for the cedent is a lower price as result of lower capital charges and reduction of transactional costs. Further a smoothing of liabilities since the cash payout may exceed the treaty share of nominal reserves, at least until the claims have matured. Also less reinsurance recoverable from balance sheet and at least the embodiment variant improves cedant's cash flow. It can be a problem, that the cedant retains significant basis risk. However the basis risk can be easily estimated and/or modeled. It is another point that the quota share structure does not protect cedant from systemic risk. The advantage of stop loss is that it addresses the systemic risk cedants face. One of the advantages of the embodiment variant for the (re)insurance system is a shortening of tail—hence capital off risk quickly.

It is important to note that the technical realization of the system can be applied to at least two important tracks of embodiments for systems used in financial industry. One qualifies for (i) automatic derivative regulatory and accounting treatment while the second qualifies for (ii) automatic (re)insurance regulatory and accounting treatment. Within both of those categories, there can be product/contractual variations depending on specific requirements of the individual counterparty or client.

For the derivative product track (i), possible requirement for the counterparty to have written a D&O policy and all references to insurance policies in an assigned D&O swap agreement can be removed. Also removed can be a possible language regarding notice to any other insurer from the definition of a Qualifying Securities Class Action and possible "asbestos" from the exclusion to a Qualifying Securities Class Action. In this embodiment variant the automated trigger is the filing of a securities class action against a "referenced entity" or specified company. The generated agreement can e.g. contain a schedule of reference entities (i.e., list of names of companies). The schedule of reference entities may be updated (additions made to the list of companies) during the term of the agreement. Both the operator of the system (here e.g. the (re)insurer and the counterparty can have to consent to any additions. If a securities class action is filed against one of those companies during the term of the agreement, then the operator can initiate the agreed upon payment to the counterparty. The amount of the payment per securities class action, as well as the timing of the payment(s) (settlement of payment can be subsequent to the expiration of agreement), can depend on the terms agreed upon with the counterparty and specified in the agreement. The terms agreed upon can also automatically be synchronized by the system. In any way, the potential payout schedule can be varied by agreement and detected automatically or semi-automatically.

For the (re)insurance realization track (ii) described above, it is also possible considering alterations in the realization of the invention that would result in an assigned to insurance (vs. derivative) accounting and regulatory treatment. A man skilled in the field starting from the described invention can develop further changes. In this embodiment variant the first trigger can e.g. be the filing of securities class action. In this case, the securities class action can preferably be against a company for which the cedent has written a D&O policy. The described indemnity trigger(s) is necessary to secure automated insurance accounting. The indemnity trigger(s) would establish the linkage between the operator's (here e.g. (re) insurer) payout under the inventive system and the cedent's (e.g. the operator's client's) insurable interest loss (i.e., ultimate net loss). One of the objective for a realization of a system assigned to (re)insurance can be to be as close as possible to a derivative product to preserve (1) the benefits of the system's short tail (which means the operator of the system's payout cannot be delayed until the cedent's ultimate net loss is known) and (2) the simplicity of the system. Considering an Industry Loss Warranty (ILW) (dual trigger) technical realization, whereby the definition of loss under the inventive parametric D&O system can be broad enough to generate a reasonable approximation between the payments made to the cedent/client by the operator of the system and the cedent's ultimate net loss. For example, the insurable interest could extend beyond the impact of securities class action lawsuits on a specific D&O policy written by a cedent or on the entire D&O portfolio of a cedent, to other related portfolio losses that a cedent may incur, e.g., asset losses as a result of fluctuations in the financial markets.

It is clear to a man skilled in the field that the terms of the technical realization in the embodiment variant (i) which are assigned to references to (re)insurance terms such as cedant, treaty, quota share and excess of loss, can be easily adapted to a corresponding terminology of the embodiment variant (ii) of a automated derivative (financial) product such as terms like counterparty. It is also clear for a man skilled in the art that the proposed method of automated pricing the parametric product in the description can be replaced by many other pricing approaches. Moreover, the scope of protection is not limited to a specific pricing model and/or pricing method. In addition all possible embodiment variants (as e.g. the mentioned applications to automated (re)insurance or financial products) are also not limited to the various payout options and structures, proposed in the description. In the same way as the proposed payout option, different payout schedules under different agreements (e.g. (re)insurance or derivative) are conceivable for the inventive system. While the embodiment variant dedicated to a derivative system is normally not containing a requirement that the counterparty has written a D&O policy for a "referenced entity" (or scheduled company), it can be required in the (re)insurance embodiment variant that a policy be in place by making that a condition for a company to be accepted as a "referenced entity" at least at the outset. Such embodiment variant can be structured in such a way that a full D&O policy (i.e., Sides A, B & C) has been written for the referenced or named company. As further embodiment variant it is also conceivable to accept as a referenced entity a company for which only a Side A or Side A DIC (difference in conditions) policy has been written. A Side A D&O policy responds only in cases where the company is not permitted or cannot indemnify directors & officers as in the case of derivative actions or insolvency/bankruptcy.

The invention claimed is:

1. A method for aggregation and monitoring of multimedia data stored in a decentralized way, comprising:
    triggering upcoming class actions or legal actions, one or more linkable search key words being stored in a memory, a computing unit accessing, via a network, network nodes connected to source databases, and data from the source databases being selected based on the search key words, the method comprising:
    storing in a second memory at least one rating parameter, assigned to search key words or to a combination of search key words;
    accessing, by a filter module of the computing unit, the source databases of the network node;
    generating a scorecard with data sets found by the filter module, the scorecard including a time-based rating and an exposure-based frequency rating for each rating parameter and the assigned search key words;
    dynamically generating a variable frequency value at least partially by a parameterization module, based on the scorecard for the respective rating parameter with respect to their exposure-based frequency, the variable frequency value corresponds to network class action frequency variations or legal action frequency variations, with respect to time; and
    triggering a predefined exposure threshold by a tracing unit based on a generated assigned distribution of the variable frequency values, and a trigger signal is generated with respect to time and the variable frequency values and transmitted for activation to a receiving work unit.

2. The method according to claim 1, wherein the scorecard is stored, in a way accessible to a user, with the found data sets or links to found data sets in a content module of the computing unit.

3. The method according to one of claim 2, wherein the variable frequency values are periodically checked by the computing unit, and, if at least one of the variable frequency values lies outside a definable tolerated range of deviation or a determinable expected value, the corresponding scorecard with the found data sets or links to found data sets are stored in the content module of the computing unit accessible for a user or updated.

4. The method according to claim 1, wherein one or more of the rating parameters are generated by a lexicographic evaluation database.

5. The method according to claim 1, wherein one or more of the rating parameters are generated dynamically by the computing unit during the generation of the scorecard.

6. The method according to claim 1, wherein the trigger signal is transmitted as an activation signal to a derivative operation system automatically activating or blocking corresponding financial transactions.

7. The method according to claim 1, wherein the trigger signal is transmitted as an activation signal to an automated (re)insurance operation system automatically activating or blocking corresponding financial transactions.

8. The method according to claim 1, wherein for generation of the variable frequency value or of the data of a content module, HTML, HDML, WML, VRML, or ASD are used.

9. The method according to claim 1, wherein a user profile is created based on user information, user-specific optimized data being generated, by a repackaging module, based on the found data sets or links to the found data sets stored in a content module, taking into consideration the data of the user profile, which user-specific optimized data are stored in the content module of the computing unit in a way made available to the user.

10. The method according to claim 9, wherein different user profiles for different communication devices of the user are stored, assigned to the user.

11. The method according to claim 9, wherein data on user behavior are automatically captured by the computing unit, and are stored and assigned to the user profile.

12. The method according to claim 1, wherein, by a history module, the values up to a definable past point in time are stored for each calculated variable frequency values.

13. The method according to claim 12, wherein the computing unit calculates expected values for a determinable frequency value, by an extrapolation module, based on the data of the history module for a definable future point in time, and stores them in a memory of the computing unit.

14. The method according to claim 1, wherein triggering the predefined exposure threshold comprises aggregating a parametric stop index.

15. The method according to claim 14, wherein the parametric stop index comprises incrementing occurring class actions.

16. The method according to claim 14, wherein the parametric stop index is assigned to a parametric aggregated stop loss parameter for triggering automated damage intervention systems.

17. A system for aggregation and monitoring of multimedia data stored in a decentralized way, and triggering class actions or legal actions, comprising:
a computing unit;
a memory for storing one or more linkable search key words; and
network nodes connected to source databases, the source databases being connected bidirectionally over the network to the computing unit, wherein
the computing unit comprises a memory configured to store at least one rating parameter, the rating parameter being assignable to search key words or to a combination of search key words,
the computing unit comprises a filter module configured to generate a scorecard with data sets found in the source databases by the filter module, the scorecard including a time-based rating and an exposure-based frequency rating for each rating parameter and the assigned search key words,
the computing unit comprises a parameterization module configured to dynamically generate at least partially a variable frequency value based on the scorecard for the respective rating parameter, which variable frequency value is at least partially dynamically generatable based on the scorecard for the respective rating parameter with respect to their exposure-based frequency, and which variable frequency value corresponds to network class action frequency variations, with respect to time, and
the computing unit comprises a tracing unit, in which a predefined exposure threshold is triggerable based on a generated assigned distribution of the variable frequency values, and the trigger is carried out with respect to time and the variable frequency values.

18. The system according to claim 17, wherein the computing unit comprises a module for dynamic generation of one or more of the rating parameters during generation of the scorecard.

19. The system according to claim 17, wherein the scorecard is stored with the found data sets or links to found data sets in a content module of the computing unit in a way accessible to the user.

20. The system according to claim 19, wherein, the computing unit checks the variable frequency values periodically, and, if at least one of the variable frequency values lies outside a definable tolerated range of deviation or a determinable expected value, the corresponding scorecard with the found data sets or links to found data sets is updatable in the content module of the computing unit.

21. The system according to claim 17, wherein the computing unit comprises a module for generation of the variable frequency value or of the data of a content module by HTML, HDML, WML, VRML, or ASD.

22. The system according to claim 17, wherein for each user, the computing unit includes a user profile with user information, whereby, based on the found data sets or links to the found data sets stored in a content module, user-specific optimized data are able to be generated by a repackaging module, taking into consideration the data of the user profile.

23. The system according to claim 22, wherein different user profiles for different communication devices of the user are stored assigned to the user.

24. The system according to claim 22, wherein data on user behavior are captured automatically by the computing unit and are storable and assigned to the user profile.

25. The system according to claim 17, wherein the computing unit comprises a history module, including for each calculated variable frequency values the values up to a definable past point in time, and on which the variable frequency values are accessible by communication devices.

26. The system according to claim 25, wherein the computing unit comprises an extrapolation module, by which expected values are calculable up to a future point in time definable by the user.

27. The system according to claim 17, wherein the predefined exposure threshold comprises an aggregated parametric stop index.

28. The system according to claim 27, wherein the parametric stop index comprises incremented occurring class action events.

29. The system according to claim 27, wherein the parametric stop index is assigned to a parametric aggregated stop loss parameter for triggering automated damage intervention systems.

* * * * *